(12) United States Patent
Spero

(10) Patent No.: US 7,199,767 B2
(45) Date of Patent: Apr. 3, 2007

(54) ENHANCED VISION FOR DRIVING

(75) Inventor: Yechezkal Evan Spero, 74 Moshav Tifrach, Mobile Post HaNegov (IL) 85102

(73) Assignee: Yechezkal Evan Spero, Moshav Tifrach (IL)

( * ) Notice: Subject to any disclaimer, the term of this patent is extended or adjusted under 35 U.S.C. 154(b) by 96 days.

(21) Appl. No.: 10/383,997

(22) Filed: Mar. 7, 2003

(65) Prior Publication Data
US 2003/0169213 A1   Sep. 11, 2003

Related U.S. Application Data

(60) Provisional application No. 60/384,845, filed on Jun. 4, 2002, provisional application No. 60/362,078, filed on Mar. 7, 2002.

(51) Int. Cl.
*G09G 5/00*   (2006.01)
(52) U.S. Cl. .......................... 345/7; 250/203.4; 359/601
(58) Field of Classification Search ................ 345/7–9; 701/45–47, 300–301; 340/435–436, 980; 250/203.1–203.4; 359/601–605
See application file for complete search history.

(56) References Cited

U.S. PATENT DOCUMENTS

| | | | |
|---|---|---|---|
| 3,961,181 A | 6/1976 | Golden | |
| 5,305,012 A | 4/1994 | Faris | |
| 5,598,145 A * | 1/1997 | Shimotani et al. | 340/576 |
| 5,671,035 A | 9/1997 | Barnes | |
| 5,714,751 A | 2/1998 | Chen | |
| 6,014,117 A * | 1/2000 | Hennessy et al. | 345/8 |
| 6,222,447 B1 * | 4/2001 | Schofield et al. | 340/461 |
| 6,244,703 B1 | 6/2001 | Resnikoff | |
| 6,392,539 B1 * | 5/2002 | Kanasugi | 340/540 |
| 6,393,133 B1 | 5/2002 | Breed | |
| 6,437,759 B1 * | 8/2002 | Turner et al. | 345/8 |
| 6,553,296 B2 * | 4/2003 | Breed et al. | 701/45 |
| 6,806,848 B2 * | 10/2004 | Hirao et al. | 345/3.4 |

FOREIGN PATENT DOCUMENTS

| | | |
|---|---|---|
| DE | 19824084 A1 | 12/1999 |
| DE | 19952945 A1 | 5/2001 |

* cited by examiner

*Primary Examiner*—Lun-Yi Lao

(57) ABSTRACT

A system for imposing a filter between a vehicle driver's eyes and a source of light including at least one detector facing inward into a compartment in the vehicle toward a likely position of the head of the vehicle driver and arranged to obtain images of the eyes of the driver and a processor coupled to the detector(s) and arranged to determine the location of the driver's eyes based on analysis of the images obtained by the detector(s) and to obtain information about objects exterior of the vehicle providing sources of light from the images obtained by the detector(s) based on reflections off of the driver's eyes, i.e., the position of such objects. A filter, such as a pixelated screen, is imposed between the sources of light and the driver's eyes based on the location of the driver's eyes and the information about the exterior objects providing the sources of light.

20 Claims, 5 Drawing Sheets

ENHANCED VISION FOR DRIVING

CROSS-REFERENCE TO RELATED APPLICATIONS

The present invention claims priority of U.S. Provisional Patent Application Ser. Nos. 60/362,078 filed Mar. 7, 2002 and 60/384,845 filed Jun. 4, 2002 which are hereby incorporated by reference in their entirety.

FIELD OF THE INVENTION

The invention relates to methods and systems for assisting operators of vehicles to see events and objects in proximity to the vehicle.

BACKGROUND OF THE INVENTION

It is difficult for operators of vehicles such as automobiles, buses, trucks, aircraft, trains and boats to see everything around them, especially objects in their path of travel while driving, flying and piloting. Environmental factors such as the blinding sun or headlights of oncoming or approaching vehicles may interfere with correct visual perception. For example, a red stoplight may be hard to see against the sun and a fighter pilot will lose sight of enemy aircraft as they fly into the sun.

Headlights, especially those incorrectly aimed or left in high beam mode, are a major source of discomfort in night-time driving. Oncoming headlight glare is a major cause of driver fatigue and in some instances, the driver is blinded and left unable to see pedestrians or objects in the vehicle's path. The headlights of following vehicles, especially those installed at higher mounting heights, such as in popular sport utility vehicles, are reflecting at greater intensities off the rearview and side mirrors causing discomfort to many drivers.

There are a number of products and patents on devices to eliminate glare from the sun and headlights from oncoming vehicles. They basically can be broken down into three types. The first type are mechanical shades and filters similar to the present sun visor in which the view of the scene is generally subject to the same blockage or attenuation as is the glare source. The second group attacks the problem from the side of the headlight in addition to the driver by using a polarizer on the headlight to align the light for later blockage by a second offset polarizer on the driver's side (see for example, U.S. Pat. No. 3,935,444 to Zechnall, et al. assigned to Robert Bosch G.m.b.H. which describes a polarized light beam source in a vehicle headlight).

A third group to which the invention is primarily directed, uses a light attenuating element only in the specific region of the view from where the glare is observed to be coming from. That is, the driver's view is through a windshield or screen with addressable pixels which when activated, change from light-transmitting to being capable of absorbing light, i.e., light-absorbing. Detectors and a logic control device assess the path of the light rays between the glare source and the driver's eyes and determine the coordinates on the screen through which the rays pass.

An automobile automatic glare reduction method proposed by Faris most recently in International Publication No. WO 02/089714 together with U.S. Pat. No. 5,305,012 uses knowledge of the location of the driver's eyes and the location of the oncoming vehicle's headlights to generate coordinates on a pixelated light valve screen to block glare from the sun and oncoming headlights. Two cameras, one with a view of the environment surrounding the vehicle and one with a view of the passenger compartment, are required. Images obtained from each camera are analyzed to perform pattern recognition for relevant objects. A detailed geometrical analysis is completed each time for the glare source and eye location. These ever-changing spatial locations for multiple light sources and the eyes are used to calculate the blocking point on the pixelated light valve screen. This method suffers from the complexity of using two cameras and the intricacy of computational requirements in a rapidly moving and dynamic environment. A single camera solution is also proposed but it involves locating the camera on the driver's spectacles. This is similar to the Barnes patent (discussed below) and the thought of consumers purchasing no less using such a cumbersome device seems impractical.

U.S. Pat. No. 6,393,133 to Breed et al., also proposes a two camera system using knowledge of the location of the eyes to block glare from the sun and oncoming headlights obtained from an exterior monitoring system. Once again, the key to this technology is the use of trained pattern recognition algorithms and particularly an artificial neural network to recognize the spatial coordinates of the eyes and glare sources and likely involves massive amounts of calculations in a short time frame to sort out the geometries.

There are numerous mechanical and filter material glare shield patents, some with manual and some with automatic positioning, but all will block a general area of the view and not only the glare sources which potentially conceals important information from the driver. A patent which straddles the use of mechanical and electronic sun visors is U.S. Pat. No. 5,714,751 to Chen. Chen describes an automatic visor for continuously repositioning a shading element to shade a target location from the glaring sun. Although an inexpensive detector is now used for the outside glare, this system is only suitable for use with the sun and still uses complex routines to calculate the spatial location of the interior and exterior subjects of interest and the intersection of a ray between them.

British Pat. No. GB 212836 by Nitsche (check the number because a six digit British patent is quite old), U.S. Pat. No. 5,671,035 to Barnes and International Publication No. WO 03/005942 to O'Halloran propose electronic spectacles for use by a driver of a vehicle for minimizing glare from the headlights of an oncoming vehicle. Typically, the spectacles comprise a frame with lenses formed by panels having an electro-optical medium laminated therein. An electronic sunglasses device is also described for selectively reducing the intensity of light in the field of view of an eye. The device can reduce the light intensity emanating from multiple sources. The eye gear has a frame, a power source, a light sensor and two light transmissive lenses having an array of shutter elements. If the light intensity signals exceed threshold values, then one or more elements of the shutter matrices of each lens is darkened.

U.S. Pat. No. 6,244,703 to Resnikoff describes an improved system for calibrating such a device to accommodate differences in facial geometry. Although a single camera/detector system is described, the driver/operator is required to wear a special pair of glasses. This is inconvenient for people who do not wear eyeglasses and are not accustomed to having to wear glasses especially at night and also for people who wear eyeglasses who would have to manage with two apparatus. The need to find and put on and the possibility of misplacement of such a device make it less practical than today's ready-for-use sun visor.

The above patents, though complex, inconvenient and not suitable for installation in consumer-purchased vehicles, have advanced the state of the art and include many of the necessary techniques and algorithms and are included herein by reference.

There are many advantages to be had and numerous applications of anti-glare and other selective field blocking systems making use of the driver's/operator's eye location and gaze. The application below includes some of them and many others are listed in other patents such as those above. All equipment operators of land, air and sea-based vehicles would benefit. A pilot following an aircraft in a dogfight would lose sight of the enemy as he flies into the direction of the sun. An anti-glare system which would allow him to continue visual contact with the enemy aircraft would be highly advantageous. For an automobile alone, there are numerous safety and convenience functions including locating of the eyes of the occupant to permit automatic adjustment of the rear and/or side view mirrors, determining the onset of driver drowsiness, blind spot detection, preventing airbag deployment induced injuries, positioning the driver's seat to place the eyes at the proper position to eliminate the parallax in a heads-up display vision systems, the identification of the occupant for customized settings and security purposes.

Therefore, there exists a need to have a system capable of eliminating glare and maintaining data on the position of the driver's eyes with a minimum amount of components in order to reduce complexity, increase reliability and lower costs.

OBJECTS AND SUMMARY OF THE INVENTION

It is an object of the present invention to provide a new and improved system and method for reducing glare on a vehicle or equipment operator's eyes.

It is another object of the present invention to provide a new and improved system and method for enhancing a vehicle operator's view of the surrounding environment taking into physical phenomena that would impair the operator's view such as sun glare.

It is another object of the present invention to provide a new and improved system and method for improving the conditions for a driver to operate a vehicle.

The invention thus relates to a method and system to enhance the visual performance and alertness of an equipment or vehicle operator and provide data on the operator's location as input to other safety and convenience devices. The method espouses utilizing the minimum number of elements to get the job done while also increasing the reliability and reducing the complexity. As its essential components, the system includes a camera to acquire data of the driver, a computer to analyze the data and a see-through screen to alter what the driver sees.

As used herein, a camera will generally include CCD or CMOS image sensor arrays with or without an accompanying lens and with or without spectral filtration; quadrant detectors; photodiodes; and other radiation detection paraphernalia.

As used herein, a screen will generally means an element which is clear in one state or condition so as to substantially allow light transmission while in another state or condition, the light transmission is affected. It may filter the light by passing only certain wavelengths or it may change the frequency or path of the light using any optical properties such as diffraction polarization, fluorescence etc.

A screen as used herein will thus generally include an element containing addressable pixels constructed of a substance which when activated alters the propagation of electromagnetic radiation passing through it; a non-pixelated element containing a substance which when activated alters the propagation of electromagnetic radiation passing through it; liquid crystal screens, including cholesteric, ferro, ferri- and anti-ferro-electric, polymer liquid crystals, electrically controlled birefringence or polymer-dispersed liquid crystals, dyes, dichroic dyes, suspended particle device-SPDs, electrochromic, photonic band gap structures and devices and other display technologies; screens, films, visors windshields; a visor or window element constructed with a film or of a material that when excited by a radiation of a specific characteristic causes the material to change its light transmissibility. For example, a scanning laser aimed at the critical viewing area of the windshield made of this material will darken specifically the location of the glare source rays attenuating them.

A screen will also be considered any other object capable of performing any of the following functions: glare reduction screen, glare blocking screen, glare attenuation screen, display screen, view screen, windshield film for placement over the windshield, film for placement within the windshield a variable light transmission sun visor replacing the opaque sun visor of today, display screen for text and images, part of a heads up display system, part of a 3-D display system, polarizer, parallax suppressor and other screen functions.

As used hereon, a computer or processor will generally include electronic or photonic circuitry capable of carrying out mathematical and logic calculations, a Central Processing Unit (CPU), Digital Signal Processor, embedded device, Driver Boards for other devices, power supply control elements, diagnostic routines, display indicators be they visual or audible excepting those of the screen, computer algorithms and machine code for calculations and memory devices such a random access memory, media borne memory device, programmable memory devices and other information storage technologies.

As used herein, a driver will generally mean the operator of an automobile, truck or bus, the pilot of airborne or space craft, the pilot of a waterborne craft, the operator of mobile heavy equipment machinery, the operator of machinery, and other devices including computers and viewers of visual displays As used herein, light sources such as headlights, LEDs and display screens will generally include headlights include all light sources of roadway lighting for vehicles from oncoming, same direction or following vehicles including taillights, backup lights, LED, discharge, and incandescent light sources for use in eye location include the visible, near IR, near ultra violet and IR and microwave spectrums, and a display screen such as the gauge console in an auto, a HUD display in an automotive or aircraft application or a computer console or TV screen in a viewer situation can serve as a radiation source for detection purposes.

In one embodiment of the invention, one or more inward-facing cameras and/or detectors supply data to a computer program which analyzes the location of the driver's eyes, reflections of the eyes and/or where the eyes are looking. If headlights of oncoming vehicles blind the driver, obscuring his view of pedestrians, then pixels on the windshield or clear sun visor or an attachment thereto act as a filter to reduce their intensity. If glare from a mirror is causing discomfort, then either pixels of a film overlying the mirror or on a display screen are activated to block the returned rays, or the mirror itself is actually comprised of a normally reflecting LCD screen and the computer causes the pixels at the glaring location to become temporarily non-reflecting. In addition, it maintains a history to aid in analysis and aids the driver by supplementing his view. That is, if the driver is looking in the mirror and something is blocking his view, then the mirror in addition to, or in place of, becomes a display screen and an enhanced camera view from an additional camera with a view of the rear is substituted for the real view.

An important feature of the invention is its ability to use only one or more inwardly-facing cameras. The prior art glare reduction systems have the complexity of both outwardly and inwardly facing cameras for this task. In the present system, information concerning the objects of interest inside and outside of the vehicle is gleaned from the reflections off of the driver's eye.

Another advantage of the method is the ability to accurately determine the eye location and the coordinates of the blocking pixels with a minimal amount of calculations. To increase accuracy, a screen raster is used to provide feedback and assure eye location and system performance correctness. In general, the screen raster provides a simplified means for obtaining eye location which has application in numerous eye tracking fields including use with computer displays.

In its simplest form, the night operation of a glare reduction system based on the concept operates as follows. The driver, when disturbed by glare, deploys the electronic glare screen before his eyes. A single camera mounted atop the screen receives image of the eyes. When a glare event occurs, the camera sees an ever-increasing bright dot or glint on the eye. Computer analysis determines if this glare is disturbing and if so through techniques elaborated below determines the x,y,z, left right, up down and depth Cartesian coordinates of the eye, the glare source origin, the ray between them and its intercept point on the pixelated display screen. The computer driver then activates pixels at the particular location causing them to reflect or absorb sufficient light from the sun or headlight such that it is no longer disturbing. If necessary, an image/pattern recognition technique is used in order to differentiate between the bright dot on the eye and the dot reflected off of the glasses or nose ring etc. More than one eye and glare source locating method may be used at once. The methods may be combined to yield more accurate or quicker solutions and accommodate the possibility of the driver wearing glasses.

In one particular embodiment, the camera, aimed at the face, is to image the eyes and receive reflected light therefrom. With a view of the eye, the camera now "sees" an imminent glare event as the eye is illuminated by the oncoming headlights, until, due to the diminishing distance, the increase in intensity has become an annoyance. The same for the sun, even though during the day there is stray light; the glaring sun's reflection off the eye is much brighter. Typically, the camera will see a white dot on each cornea per glare source.

BRIEF DESCRIPTION OF THE DRAWINGS

The following drawings are illustrative of the embodiments of the invention and are not meant to limit the scope of the invention as encompassed by the claims.

DETAILED DESCRIPTION OF THE INVENTION

Figure 1:
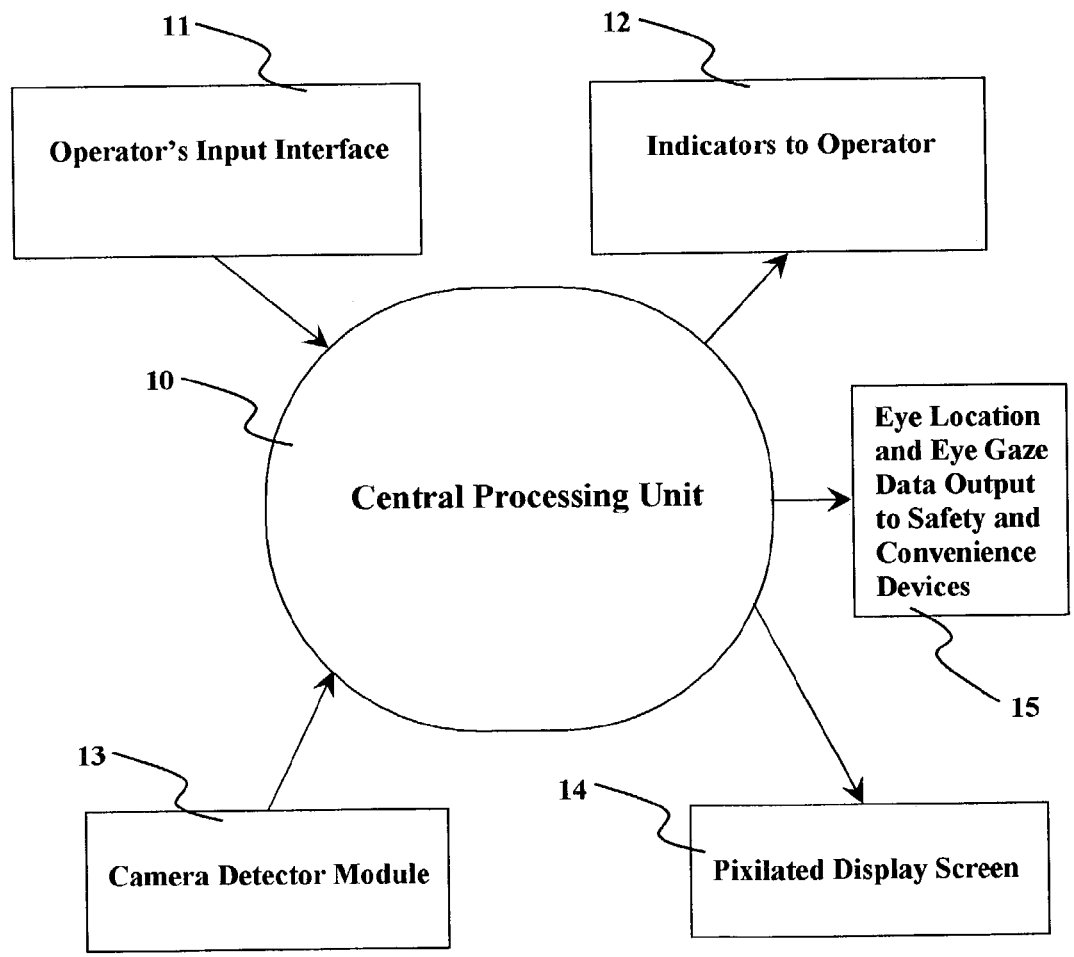
FIG. 1 is a block diagram of a driver monitoring system in accordance with the invention which acquires information on a driver's eyes, interprets the information and outputs commands to vehicular components such as a glare-reducing screen.

Referring now to the accompanying drawings wherein like reference numerals refer to the same or similar element, FIG. 1 is a block diagram of an application of the proposed method in an automotive system showing the various input and output devices. A control unit, CPU, DSP, microprocessor, computer, any or all of which are designated as 10, comprised of a logic and memory circuitry receives input signals from the driver, camera/detector unit 13 and optionally other sensors such as temperature sensors.

The CPU 10 performs analysis of input data and outputs signals to the display screen and/or safety, utility and convenience devices which serve the operator. The computer has a database of parameters, templates and programs. Computer algorithms carry out logical analysis of input data, compare with templates, scenarios and offer information to the driver or other safety and convenience devices. The computer 10 will also perform diagnostics of all system components. The driver interfaces with the system and provides inputs 11 such as a request for system operation and defines specific driver characteristics such as being a glasses wearer and/or vehicle and environmental characteristics. The input device may be a keyboard, microphone, or any other type of manual or automatic input device.

The CPU 10 supplies information to the driver through indicators 12 such as system on/off, system readiness (includes calibration routines and interface with messaging on display screen), system, malfunction etc. The indicators 12 may be visible or audible such as sounds from a speaker or light from an LED of a certain color or flashing frequency.

The CPU 10 mainly receives input data from one or more camera/detectors 13. The CPU 10 uses the information to obtain driver and glare data including the location of eyes relative to the blocking screen, glare level on the eye or eyes, eyeball geometry, eye gaze, and head position. The CPU 10 uses techniques described herein, e.g., by executing algorithms implementing the techniques, and then determines the coordinates on the see-through display screen 14 to perform glare reduction. The CPU 10 may also optionally drive an addressable pixelated screen (APS) 14 to display message information to the driver or repairmen, perform metrics such as to test driver alertness, provide alternate eye blocking, polarization or parallax barrier for use with 3-D imaging devices in Heads Up Display systems and act as generalized sunglasses in daytime use. The CPU 10 may also be connected to a telecommunications unit to convey the information to a remote facility, e.g., a remote assistance facility to enable assistance to be provided to the vehicle if the driver is determined to be incapacitated or drowsy.

The CPU's 10 data on the driver is also available for numerous other functions and that information can be interfaced over a data bus 15 including a wireless data communications system. A car with motorized rear and side view mirrors can now be provided with or upgraded to have automatic aiming in real time to ensure optimal positioning and eliminate blind spots. Similarly, eye location and eye gaze output is required by many other safety and convenience devices and the CPU 10 can supply them data or have open slots to be filled with drivers for them later.

Figure 2:
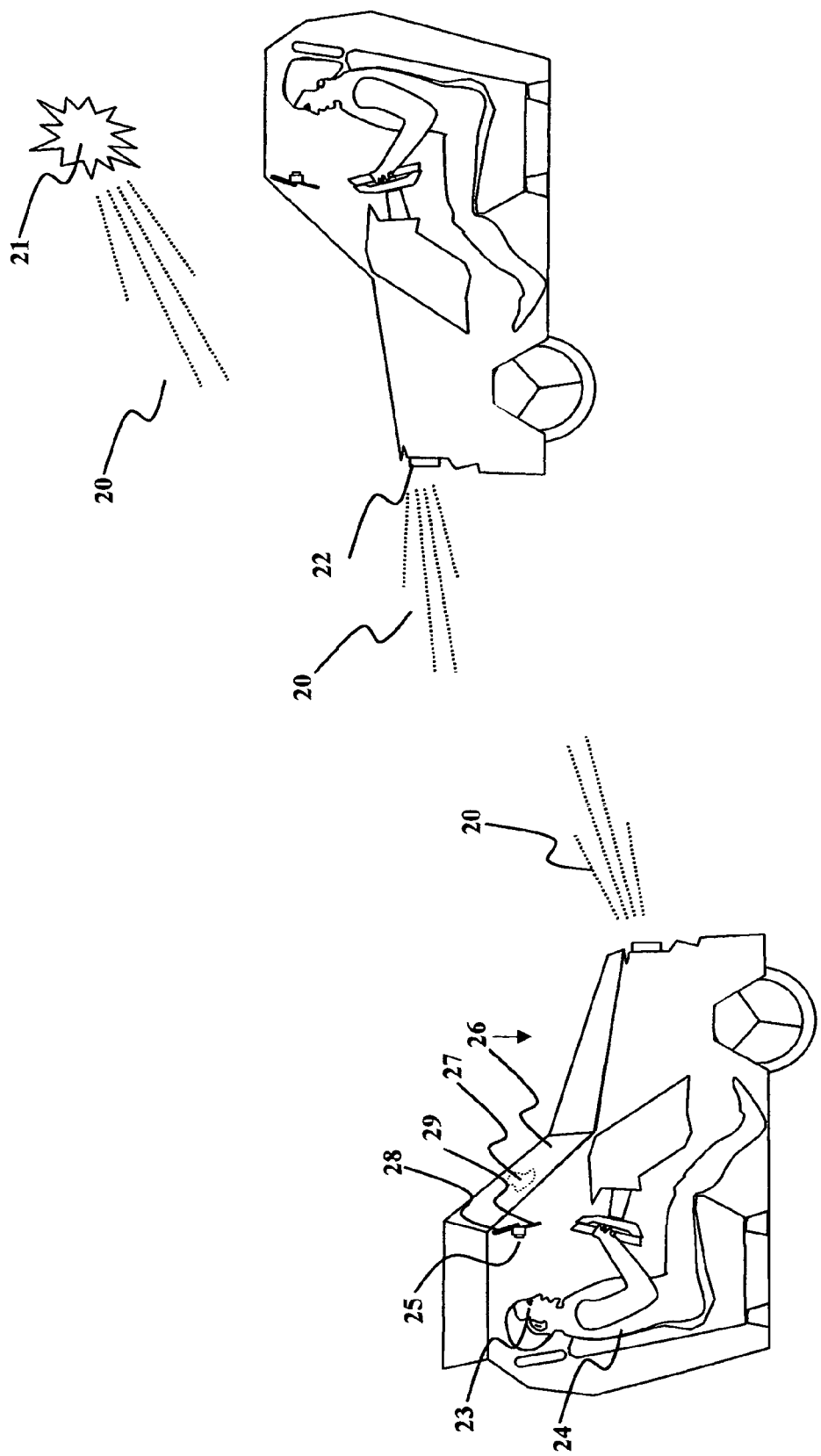
FIG. 2 is an illustration of the anti-glare system of the present invention to prevent uncomfortable and disabling glare from low-lying sun and oncoming headlights.

FIG. 2 is a preferred embodiment of the anti-glare system of the present invention which is a streamlined device to prevent uncomfortable and potentially disabling glare rays 20 from the low-lying sun 21 and/or oncoming headlights 22 from reaching the eyes 23 of a driver 24. The anti-glare system includes a camera 25 facing the driver (the word camera herein refers to any of optical device, lens, charge coupled device, CMOS etc. detector array and driving circuitry), a light filtering or light blocking element, layer, visor or pixelated display screen between the driver's eyes and the glaring light source which may be the windshield itself 26, any area thereon 27 equipped with a layer, (internal or external) capable of attenuating the light rays, a replacement for the sun visor 28 or a part therefrom or a positionable visor or APS 29 attached to the sun visor 28.

Where the sun visor placement of the glare blocking element is used, the aiming of the camera 25 may be further refined by an action of the driver 24 who adjusts the normally clear addressable pixelated display screen 29 (light filter, shutter, blocker, shade etc.) unit so that it is properly positioned before his or her eyes similar to the positioning action done with a present day sun visor. This would greatly reduce the range within which the system must operate but may also be somewhat less convenient for the driver as it requires him to limit his movement or readjust the placement of the screen 29.

When the standard non-electronic sun visor 28 has been replaced by the APS 29, the APS 29 will be used to block the sun as is today's sun-visor and the entire surface becomes non-light transmitting. The transparent light filtering/blocking element may contain addressable dots or pixels or be made of a material, such as a dichroic filter, that when externally excited, i.e. excited from without, by an aimed beam of electromagnetic or focused sonic irradiation absorbs the light or changes the lights wavelength such that it does not cause glare to the eye. A scanning infrared, far violet or near UV laser would be an example of a technique to temporarily darken the transparent material. There is a special need for a normally high transmittance on the screen. At night, it is important not to reduce the nighttime visibility. Therefore, though a typical pixelated LCD screen with two polarizers could be used, it would block over 50% of the light. Many other LCD technologies offer greater light transmission including a quick response suspended-particle, polymer-dispersed or electrochromic liquid crystal film having a high light transmittance in the optical spectrum.

Figure 3:
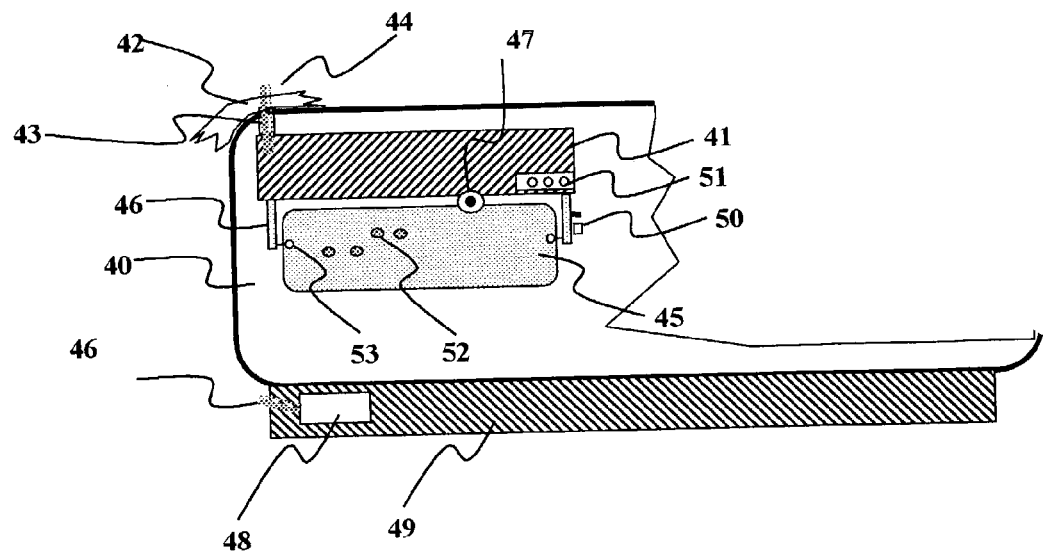
FIG. 3 is a view from the driver's seat of the components of a preferred embodiment of the glare reduction system in the form of a pull-down or flip-down sun-visor attachment.

FIG. 3 is a front view of a preferred embodiment of the glare reduction system in the form of a pull-down or flip-down sunvisor attachment that can be supplied on a new car or attached later as an accessory. A view from the driver's seat is shown looking out of the window 40. A standard sun visor 41 is attached mechanically to the car body 42 via bracket 43 on which also is carried electrical power and data signals on wiring 44. The APS, glare reduction screen, 45 is attached to the sunvisor 41 via mounting brackets 46 which must securely maintain the APS 45 in the position set by the driver. Electrical conductors and connectors are provided for power and data transfer to the APS 45 and other devices over the sunvisor 41 and through the brackets 46. Also vibrations must be kept to a minimum. Friction joints and dampers known in the art are used to accomplish this.

The camera 47 is mounted on the APS 45 and is moved into position when the driver adjusts the APS 45 so that it is basically centered before his eyes. The computer and power supply CPU unit 48 is located in the dashboard 49 and communicates via wiring 44 with the APS 45 and camera 47. The individual drivers can be on the camera and APS 45 or included with the CPU 48. Alternately, the CPU 48 can be placed on the sunvisor 41 or on the APS 45. The added components however will not interfere with the sunvisor's folding up an out of the way.

The driver can input information and preferences such as display screen parameters, to the system via a driver interface panel 50. Drivers with amblyopia or with strong preference to one eye can fine-tune the display's right and left eye parallax compensation. System operation feedback such as system on, system ready and system performing glare reduction can be displayed to the driver via an indicator panel 51 mounted on the sunvisor 41 or APS 45.

On new model cars, the APS 45 can totally replace the cardboard sunvisor either with an improved bracket 43 which is capable of large adjustments to cover the larger area necessary for sun and headlight blockage or the APS 45 size is increased. The camera 47 may be affixed to the sunvisor 41 such that even when the sunvisor 41 is folded up the camera still has a view of the driver's eyes for other applications such as mirror aiming.

In operation for example against two sets of glaring headlights, the driver will see a partially blocked view of the headlights through activated pixels 52 which appears as dark spots or dots on the APS 45. Although each headlight requires two blocking dots, one for each eye, parallax consideration, the driver sees it as one dot if both eyes are working properly together.

Additional light or radiation sources to aid in eye location can be mounted anywhere in the cars interior in front of the drivers face. They may also be mounted such that they project onto the windshield and are reflected back onto the drivers face. The windshield naturally reflects a percentage of visible radiation and this percentage increases with longer wavelengths. Alternately the windshield or parts there from could have or be treated with a dichroic film which specifically strongly reflect the radiation.

In FIG. 3, infrared LEDs 53 are situated behind the APS 45 mounted off the brackets 46 and project towards the driver's eyes. In this manner, activated pixels, such as in the trial and error eye location routine, will block their radiation to the eye when they are situated on the ray which extends between the eye and the LED. As the LED coordinates relative to the screen are known as are the activated pixel coordinates, the CPU 48 can calculate the vectors to the eyes and the eyes location in three-dimensional space will be known. These LEDs 53 or others situated such that they or their reflections off of surfaces onto the drivers face are used with the eye location methodologies described earlier where the camera utilizes the reflections off the eye and its parts to determine the eye location, corneal spatial reflection characteristics and eye gaze or fixation.

Figure 4:
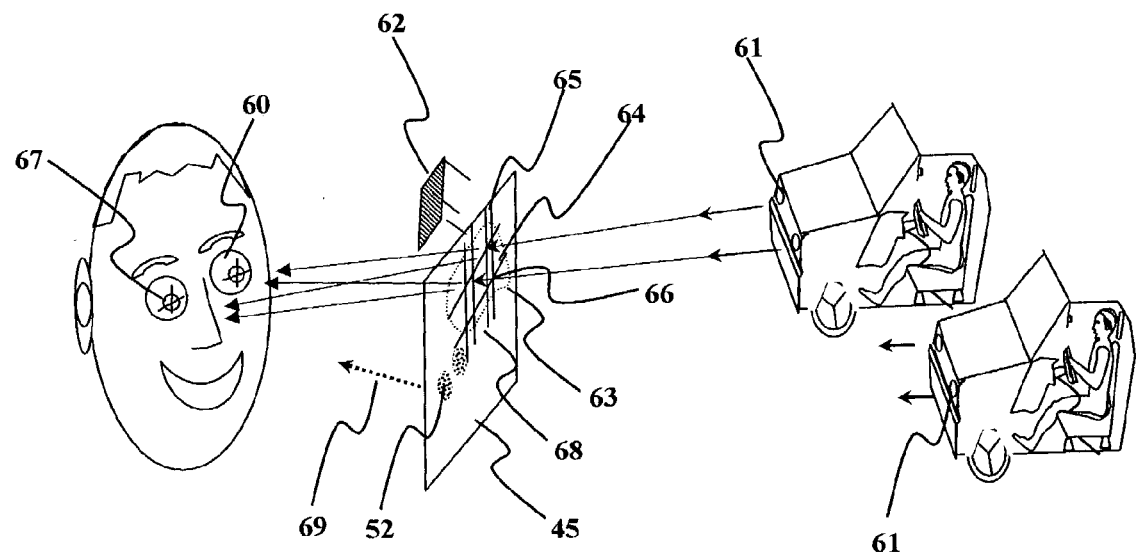
FIG. 4 is an illustration of a method which uses structured, in space and time, screen pixel activation coordinated with the cameras view of glare on the eye to obtain blocking pixel coordinates.

FIG. 4 is an illustration of the Timed View Screen Activation method which uses structured, in space and time, pixel activation coordinated with the cameras view of glare on the eye to obtain blocking pixel coordinates. The method in one embodiment uses only pixels of on the viewing screen to determine the glare blocking pixel coordinates without having to resort to more involved computational pattern recognition, glint or redeye reflection techniques. The driver's eye 60 is accosted by the strong rays of light, emanating from the low-lying sun or oncoming headlights 61. Raster lines, a scan pattern (as of the electron beam in a cathode-ray tube) in which an area is scanned from side to side in lines from top to bottom or scanned from top to bottom with in lines from side to side, made of activated light blocking pixels are run on the APS 45.

Pixel groupings other than lines, such as circles the size of a headlight's projection, rectangles etc. can also be used. To quickly zero-in on the area of interest, entire blocks of pixels 62 are blocked off on the APS 45 for an instant, unobservable to the driver, and the effect of the glare elimination on the eye is observed at that same instant by the camera. The CPU synchronizes between the camera and the APS 45. Once the suspected, whittled down, but still relatively large sub area 63 on the APS 45 is determined more exacting pixel groupings are used to home in on the minimum pixel grouping needed to reduce the glare. The goal is to leave as much of the view open to the driver.

It is also clear the determination of the sub-area may be supplied by other methods such as glint reflection which can give an initial first approximation as to the vector from the eye back to the source and the vector's intersection with the APS 45. Horizontal raster lines 64 and vertical raster lines 65 are then run in the previously determined sub-area 63. The intersection point 66 of the horizontal and vertical lines which successfully effected glare reduction on the eye 67 is assumed to be a possible coordinate for activated blocking pixels 52. A number of lines may be run simultaneously so long as they don't interfere with the effort to obtain a unique solution. The lines are spaced at distances 68 initially assumed to be logical for headlight spacing on a car and eye spacing on a face for parallax considerations. Another or multiple vehicles' headlights 61 may also be causing glare. The CPU may utilize scenario templates of possible headlight locations of multiple vehicles in the opposite lane to predict logical raster line spacing. The end result of the trial and error routine in the activation of a group of pixels 52 on the APS 45 so that the light rays 69 from the headlight 61 reaching the eyes 60 and 67 are reduced in intensity.

Figure 5A:
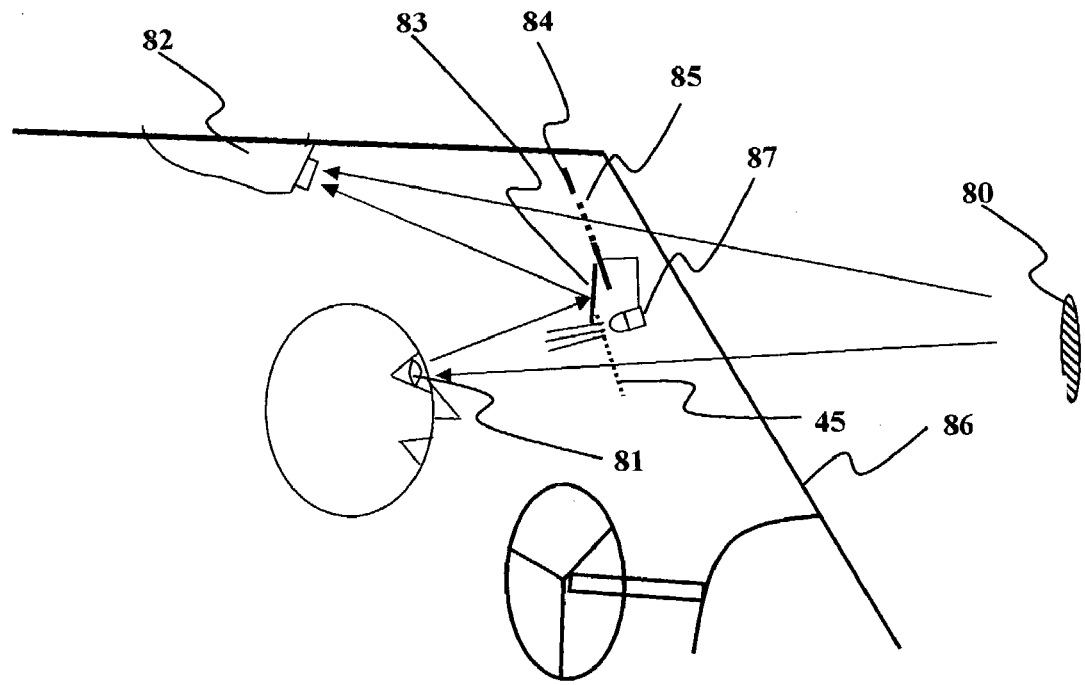
FIG. 5A is a schematic of a single forward facing camera device for glare reduction and other functions such as lane guidance, 3-D display functions and accident avoidance.

FIG. 5A is a schematic of a single forward facing camera device. This embodiment has a number of features not available in the earlier ones. The camera especially a wide angle or fisheye camera may have a view of the outside and thus may perform other functions such as lane guidance and accident avoidance. The glare source 80 is visible to the driver's eye 81 via a light transmission control element such as the APS 45. The camera 82 is facing forward and is aimed so that it has eye reflecting mirror 83 in its field of view. The camera may be on the headliner or on an adjustable mount so that it may be kept substantially close to the eyes. It is assumed that a high hat is not worn while driving.

The eye reflecting mirror 83 can be adjusted independently of the APS 45 if necessary for driver's of different heights or it may be motorized and automatically adjusts itself until a vie of the eye has been obtained used any of the eye identification method previously described. Since the glare light reflecting off the eye is a weak signal the mirror surface is highly reflective 99% such as 3M VM 2000. The camera can now be larger since it is not located in front of the driver, which may be a safety factor in an accident. A larger aperture will let in more light so in the end the system may have a better signal input that an eye facing camera.

An additional option with the forward facing camera is to have the view ahead on the road included in its fields of view. Thus in one view there is a view of the glare source and of the eyes and each can be calculated for the coordinates as in the Faris patent and the camera offset from the eye 81 and the APS screen 45 used to calculate where the blocking pixels should be. The camera would see out above the sun visor 84 or an opening 85 in the sunvisor is provided for the camera 82 view. If the windshield 86 is tinted then also there would be no tint is this area to maximize visibility.

As mentioned earlier, a properly enhanced windshield 86 could serve as the addressable pixilated screen 45 and also as the mirror 83. A dichroic coating on the windshield could enhance reflection of a wavelengths used in the eye tracking system or the camera would be sensitive to wavelengths that the window is naturally reflective of such as long IR. To calibrate the positions of the eye 81 camera 82 and screen 45, one or more LEDs 87 is positioned behind the APS glare screen 45 at a known relative coordinate to the screen.

The raster method described earlier in FIG. 4 is used to get the coordinates in the cameras array at a specific instant where the z component or spacing between the eyes is known. As described earlier, other methods such as redeye or eye glint can be used in the calibration process. The opening 85 would foil the use of the sun visor for normal sun blocking. Therefore it is normally covered by the folded up APS 45 which will be activated to block over the area coincident with the opening 85.

Figure 5B:
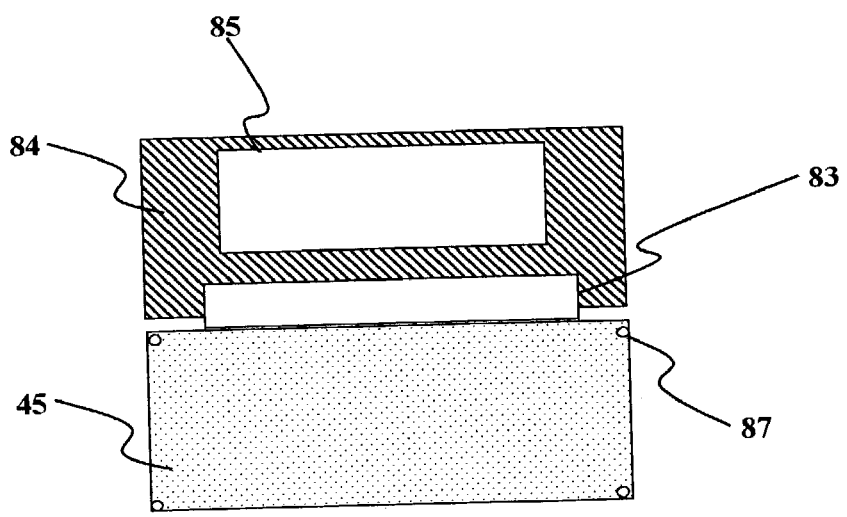
FIG. 5B is a front view of the forward facing camera device showing an opening in the sun visor.

FIG. 5B is a front view of the APS 45, mirror 83, sunvisor 84 and opening 85. Alternately, in place of an opening the top of the sun visor is shaped such that the camera has an unencumbered view of the road whether the sun visor is folded up or is partially or totally deployed. One or more LEDs 87 are shown deployed near the periphery. If only one LED is used, a central location near the top of the APS 45 is preferred.

Figure 6:
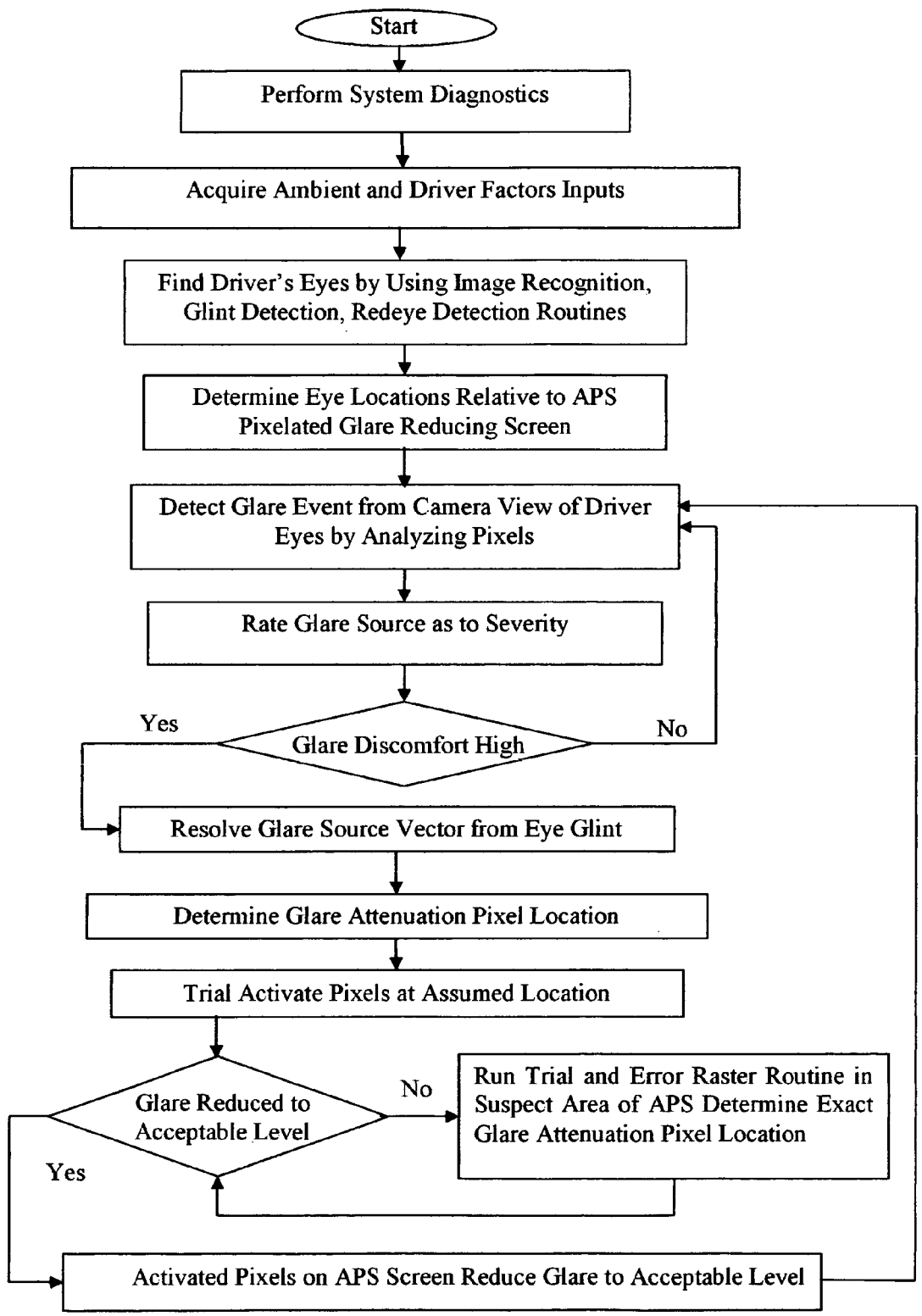
FIG. 6 is a flowchart for a preferred embodiment of the glare reduction system described in FIG. 3.

FIG. 6 is a flowchart for a preferred embodiment of the glare reduction system described in FIG. 3. The system upon start up will run a self test diagnostics routine to make sure that all components are operating correctly. The system will then acquire set up data including a calibration routine that requires the driver to look into the camera. Fundamental calculation such as determining the driver's eye spacing for later use are established at this stage.

The input data is stored and the computer begins detecting the driver's eyes followed by determining their location relative to the glare screen. The system is ready at this point to counter glare from the sun or headlights and is on the watch to find glare event on the driver's eyes. If glare is detected it compares the intensity value to parameters stored in the computers memory. If it is beyond the tolerable limits based on that data the computer will attempt to resolve the glare source to eye vector based on glint location, red eye reflection or any of the techniques programmed to run in order to accurately determine the positions.

The routines shall yield an intersection point on the glare screen which should be activated to reduce the light transmissibility. A trial activation is run and the camera instantaneously tests the result to see a reduction in the intensity reflected from the eye. If the test point is successful then full blocking routine is initiated. It is to be understood that the time frame for a camera acquisition is on the order of microseconds and the computer analysis in a similar time frame. If the trial point failed further trail and error routines are run to further home in on the point. A counter (not shown) can limit the number of trial and error iteration allowed before assuming the need to start again from detecting a glare event on the eye stage. The system continuously returns to the detect glare event stage to update the glare screen in response to the movement of the vehicles or the addition of new glare sources.

With respect to glint-corneal reflection, in another embodiment, the resolution of the detector array or a CCD or CMOS chip image sensors coupled to the imaging lens (camera) is such that the angle from where the glare is coming from can be determined from the view of the eye. The cornea of the eye is a specular reflecting surface with a spherical shape of about 8 mm radius which reflects over 2% of the incident light. A camera located at a known location relative to the glare screen with a view of the eye will find the glint or reflection of the glare source at a location on the eyeball spherical surface. Knowing the cornea's geometry and identifying the glint spot location relative to the eye center point, a vector can be generated which is indicative of the ray's angle of incidence.

These techniques as well as others using combinations with retro reflective retinal reflections, pattern recognition of the eyes and associated parts are known in the art and are detailed in papers such as those by: K. Talmi, J. Liu entitled Eye and Gaze Tracking for Visually Controlled Interactive Stereoscopic Displays in Signal Processing: Image Communication 14 (1999) 799–810, S. Zhai, C. H. Morimoto, and S. Ihde, Manual and gaze input cascaded (magic) pointing, in Proceedings of the ACM, SIGCHIU Human Factors in Computing Systems Conference, pp. 246 to 253, 1999, as well as the well-known cornea-reflex method which is used to determine the gaze direction described in ASL "Eye Tracking System Handbook", Applied Science Laboratories, Massachussetts, USA, June 1996.

With the glare source origin accurately resolved for both eyes, then in a straightforward fashion, by knowing or determining the camera's offset from the screen's position and the distance between the blocking screen and the eye, a selected area on the screen is activated by the controller. The screen pixels are activated to a light attenuating or blocking state. The blocking area contains one or more activated pixels where due to parallax considerations there will be a blocked area for each eye for each glare source. Due to the relative translative movement of the vehicles, the shape of the blocked area will be larger than required just for the glare source. Due to vibrations in the system, a fudge factor is also introduced resulting in a fuzzy dot elongated in the direction of translation.

A further aid in finding the eye and resolving the glare incidence can take advantage of the "red, eye" effect noticeable in novice photography when illuminating people with light of the camera flash emanating from a point close to the camera lens. The choroid layer of the retina diffusely reflects the light that reaches it and the optics of the eye re-image (retro-reflect) the light back to the source. Thus, only on-axis illumination returns to the camera in significant amounts, forming a "bright-pupil" image. This is described in "Morimoto, IBM" mentioned earlier and by Hutchinson in U.S. Pat. No. 4,950,069 incorporated herein by reference. The effect is used extensively alone or with other methodologies such as image recognition in eye gaze—tracking devices.

These systems for eye movement detection utilize an infrared light emitting diode mounted coaxially in front of the lens of an infrared sensitive video camera for remotely making images of the eye of a computer operator. The reflected light causes bright eye effect which outlines the pupil as brighter than the rest of the eye and also causes an even bright small glint from the surface of the cornea. Due to the optics of the eye, the retro-reflection effect is stronger for light imaged close to the foveal region, thereby constraining camera placement as close to where the user is looking as possible.

In an embodiment where the screen is attached to the sun visor or roof (i.e., not on the windshield) and can be adjusted, this is accomplished when the driver initially positions the screen (the camera/detector array is attached to the screen) such that it is before his (or her) eyes and he will maintain his position or reposition the screen as is needed to continue the glare stopping function. Since the driver is disturbed by the glare, it is sufficiently enough before him and the retro-reflected rays from the retina will help in locating the eye and the direction of the glare source. An infra-red IR source such as an IR LED mounted adjunct to the camera lens will clearly be reflected by the eyes as the driver is looking ahead at the road and the two eye coordinates clearly established.

The eye tracking literature also details systems utilizing one or two cameras which fairly accurately locate and track the eyes and these methods are included herein for use with automotive and equipment operator applications.

Using the earlier view of the corneal glint reflection and the now mentioned red eye reflection while driving and especially at initial calibration, a number of accurate measurements may be taken and stored. In one embodiment, a number of IR LED sources are positioned at known coordinates relative to the camera and blocking screen. A preferred location would be the four corners of the blocking screen and adjacent to the camera. At an instant where the driver is looking directly at the camera, LEDs from the periphery are fired. The direct-on-retinal reflection is very strong in this instance, and a direct line vector is easily established to the x and y coordinates read off the excited pixels in the camera sensor array. The glint coming from known sources at fixed distance from the camera and from each other now show up on the image of the eye at specific locations relative to the eye center.

The eye center is pattern recognized by the sharp pixel intensity differences between the image of the dark pupil surrounded by the illuminated iris. The four glint positions with the direct-on-retinal reflection eye coordinates can now be used to determine the vectors to the IR sources.

Solving the trigonometric equations determines the depth, z coordinate distance away from the screen, of the eyes. This in turn allows for a more exact determination of the eye spacing. The eye spacing can then be used from hence on to determine depth distance or the z coordinate in subsequent calculations. The coordinates of the camera relative to the blocking screen are known or determined, the actual distance between the eyes is known or determined, the pixel coordinates of images of the eyes captured by the camera at known z coordinate are known or determined, therefore subsequent foreshortening or elongation of the spacing in the camera pixel's image of the eye centers with distance is proportionally the change in the distance of the eyes from the screen. In addition, the corneal reflection characteristics for the specific driver's eye geometry having been calibrated can now be compared with standard models of corneal surface topography and templatized for future calculations. Thus, the different reflection characteristics off the cornea and off the retina can be identified and used to pinpoint the glare source.

In another embodiment using the retroreflectivity or bright pupil effect of the retinal reflection, the need for vector screen interception calculations can be not only simplified as before but also now may be totally eliminated. The retro-reflection property means that the glare induced red-eye rays are directed back at the blocking screen at the same coordinates where blocking is required. If there are photodiode detectors capable of recognizing this wavelength specific radiation, they will be proximate to the location of the blocking pixels. Interpolation of the relative signal strength of adjacent detectors will give the exact blocking coordinates.

It should be understood that in place of a camera (here construed to comprise a lens and concentrated multi-sensor array) detectors or emitter/detectors (devices which send the light and detect light reflected) of narrow spread, could be used to find the eye position and even eye fixation. One or more rows across and down the normally see-through blocking screen at the center or edges would accurately locate the eye. The emitter/detectors are small and/or transmissive and placed at the distance derived from retroreflection divergence angle spacing, about 2.5 degrees from the normal, and the maximum design distance of the screen from the eye. A detector or emitter/detector that can be used is an organic LED or OLED which is an area transmitter that can be clear or light transmissive. OLEDs in reverse are also photovoltaic such that they are capable of detecting the red-eye reflection. A blocking screen then would be made of detectors as well of blocking pixels.

In a preferred embodiment, the screen is an integrated device of mixed array on the same or different layers blocking pixels and detectors. In another embodiment they are two separate devices with independent circuitry but there is coordinate registration between them.

In an alternate embodiment, instead of using emitter detector sets, the numerous distributed emitters or sources can be replaced with one or a few spectrally and/or spatially unique emitter/s radiating towards the screen with the screen partially reflecting the radiation back into the eye.

A timed firing of the emitter radiation sources is picked up by the camera and the strongest reflection from the face will be at the eye gaze point. Then, if there is a concurrent glare event when the emitter is switched off, the detector at the immediately previously determined eye gaze point will be reading the retro-reflected glare. This intensity will allow for the determination of the glare severity and if and how much blocking is required at that specific location. Stray light having spectrum similar to the red-eye reflection of headlights emanating from following vehicles or other light sources in the passenger compartment and radiating onto the detectors needs to be deducted from the calculations.

To handle this wash out or noise from following light, averaged readings from the detectors in the immediately adjacent locale are deducted from the detector reading. Alternately, when the eye gaze fixation point is previously known, an instantaneous activation of the blocking screen at that location will eliminate all retro-reflected headlight radiation from the detector, any stray light is then measured. Then, blocking is turned off and the subsequent higher reading is the result of the retro-reflected glare. If there are strong reflections off of the driver's glasses frame, a computer routines described later ferrets them out.

In another embodiment, the camera is facing forward and receives a reflected image of the face and eyes of the driver. As stated earlier, in order to ensure good red-eye retro-reflection, the source and the detector need to be in close proximity which entails the use of many sources and detectors over the area of view or detailed calibration routines. In this embodiment, one or more cameras is facing forward, i.e., towards a sun visor attached to the blocking screen or the windshield and a) the windshield or blocking screen have enough natural reflectivity to return to the camera the "red-eye" reflection" or b) they have been treated or coated at least in the essential viewing areas such that they are more reflective of the pertinent red-eye wavelength.

The camera light source is the headlight of the oncoming vehicle or a scanning beam or discrete light sources such as infrared LED's, which when in alignment, will give a good "red-eye" retro-reflection effect. The additional light sources are located in front of the face on the blocking screen, sun visor or windshield, and/or on the dashboard and/or within the instrument panel and/or steering wheel and/or atop the dashboard aimed at a reflecting surface into the eye and/or from the rear on the head rest or roof and be reflected off of the blocking screen, windshield or mirrors where the mirrors include the side and rearview mirrors which are usually aimed at the eye and which may be part of a computer aided automatic mirror aiming regimen or the mirrors are specially placed and angled to maximize obtaining a good "red eye" retro-reflection effect.

Typically, the eye tracking literature reports significantly less than near 100% accuracy desirable in safety-related automotive applications. This situation is further exasperated in the real world non-ideal and ever-changing environment of transportation vehicles. An incorrect data analysis in an automobile at highway speeds could lead to life threatening accident. Although significant improvement is realized in the proposed system by simultaneously utilizing any of the above-described methods of pattern recognition, glint reflection orientation, red-eye, bright pupil and dark pupil effect to locate the eye, the accuracy may not be known to the system. Thus, it would be beneficial if the system had a method of corroborating the assumed eye or blocking coordinates before deploying any potentially driving disruptive measures.

In an alternate embodiment for eye tracking, one camera is located looking forward and receives a view of the driver from one or more mirrors aimed at the face which may be the rearview and side view mirrors (the side mirror visibility may suffer from condensation etc.) or mirrors on the light blocking screen or located anywhere forward or off to the side including a greater than 180 degree camera with a view of the head from the rear. The mirror may be selective to certain wavelengths while being transparent to others. Now more resources can be dedicated to the optics—specifically a good lens. For night work and rapid clock speed, the larger the aperture the more light may enter, requiring a large lens—this assuming that it is less expensive to build higher resolution into the CMOS or CCD array, especially if it is monochrome. The camera now sees the eyes and glare screen itself and any of the previous methods can be used. It may also have a view of the headlights themselves through a cutout in the sun visor through the top of the windshield where tinting has also been removed. Using the earlier Faris method, the invention can be realized with one camera that sees both eyes and glare source.

In another embodiment, unique use of the addressable, light modifying screen as a stand-alone methodology for eye observation with the camera or for use in conjunction with other eye tracking techniques is made. As a stand alone, a trial and error blocking raster method is used to determine which areas of the light-blocking screen need be darkened to stop the incoming glare. Its use with other methods is especially appropriate if the resolution capability of the optical acquisition system is less exact than needed and/or the data is insufficient to know exactly which areas on the screen are to be toggled from transparent to blocking.

Trial and error routines are employed with the other methods to reduce the time needed to obtain the exact coordinates. The trial and error method utilizes the relatively slow speed of vision, its persistence (the effect which allows movie frames to change at a rate of 30 frames a second to be fused in the mind), to allow for an instantaneous, unobserved test blockage of radiation to the eye. This test may occur over the entire screen and aid in calibration and signal noise cancellation for utilizing the earlier eye tracking methods above, or the blockage can occur at a specific screen location according to calculated or assumed glare ray intercept coordinates. Using light sources at the periphery behind the screen, an exact location of the eye can be obtained as can the distance between the eyes for use in depth calculations.

The trial and error method involves a raster-like scanning such as the normally unobservable lines on TV screens. A horizontal row of pixels across the screen may be darkened for a short time, e.g., a $30^{th}$ of a second. If any of the pixels along the row are in line with the glare source, then the camera will detect a reduction in light intensity reflected off of the eye. Sequentially, the same can be done with a vertical line down the screen as it is moved across sideways.

Further, the screen may be divided into a number of zones where in each such zone, simultaneously yet sequentially, horizontal and vertical lines are darkened to speed up the process of locating the pixels which will block the glare. A logical spacing of lines in the vertical can be based on the distance between headlights or height of the headlight in the horizontal to differentiate between objects. The fact that each eye needs separate consideration requires another set of close spacing test lines. Once having learned the distance between the eyes (through experience of what works), the controller will automatically know where to place the parallax required line for the other eye. The junction of a vertical and horizontal line could indicate a possible x-y blocking pixel location. (Possibly although not certainly since there may be multiple light sources and one vertical may belong to a different horizontal.)

To narrow the results, a further immediate activation of the candidate horizontal and vertical lines sequentially or the pixel at the intersection will provide confirmation. Some initial information as to where to look for the pixels which will block the glare can still come from the location of the bright spot on the eye, glint method. In one embodiment, small LED IR sources located behind the blocking screen at the periphery and aimed towards the driver are at known coordinate locations and in exact registration with pixels thereon.

The camera receives the timed radiation signal from the LED and recognizes the eyes and their location in the camera view. The vertical and horizontal rasters passing over the LED blocks the rays on the way to the eye and the camera picks up this occurrence and the computer records the intersecting pixel coordinates. The same procedure applies for the other eye. Having two points, that of the LED and that of the screen pixel, a vector can be constructed to the eye and the exact physical distance between them measured. Once the physical distance between the eyes is obtained, it is used in further depth calculations based on the camera foreshortening. The end result of the trial and error routine is the location of pixels on the blocking element for each eye, which if switched from their transparent state will diminish the glare from the oncoming headlights or sun. As the headlights move relative to the car, the computer routine, from its success at trial and error locating, can analyze the speed and predict where next to block out areas on the screen.

After obtaining information from the eye view through any or all of the above methods, the processor (CPU 10) calculates the coordinates on the view screen which lie on the intercept of the glare source and the eye. The screen driver then activates or deactivates the pixels at that point to reduce the light transmission. Depending on the LCD screen technology used, the pixels' light absorption or reflection property is adjusted to reduce the glare. If the pixels are made of a substance that totally blocks light when activated, multiple smaller pixels are used and not all pixels are blackened. This like the dots pictures on newsprint depends on the density of dpi (dots per inch) to render the amount of reduction.

Since the system (eyes, vehicle, oncoming headlight) is full of movement and vibration, the blocking pixel size or group of pixels may be larger than the glare source (fuzzy rather than fine cut off) so as to allow for a fudge factor. At the time of scanning, the blocking pixel is off. This is for two reasons: 1) the spot on the eye must be visible in order to ascertain where it is moving and continue being blocked and 2) the trial and error system needs to get feedback on the attenuation. The eye works as an integrator receiving light energy over time and thus perceiving brightness. If the blocking pixels are actuated part of the time, the glaring beam is attenuated and brought down to non-disturbing intensities rather then being totally blocked. This reduced view of the headlights is desirable since total blockage may mislead the driver into assuming there is no car in the oncoming lane. That may have dire consequences if moving out into the other lane is contemplated for example for passing.

The size of the pixel or group of pixels used and their "fuzziness" may vary with the speed to take into account the relative movement of the vehicles, vibration and the glaring headlights across the screen. The limiting factor is that necessary visual information of the scene up ahead not is occluded by the blocking pixels.

In general, the glare sources are situated in the opposing lane where the vehicle is not supposed to be traveling anyway so that a fuzzy blocking, which covers more than the headlight and takes vibration and movement into account can be tolerated.

In a selective light filtering (versus all wavelength blocking) system where the longer wavelengths such as the infrareds which is not visible to the eye are not blocked, the infrared wavelength reflected by the eye is still visible during blocking to the camera where such camera's light filter allows in that infrared radiation, even while the glare reduction is in progress. In general, a capability of the camera to see infrared radiation from the headlights would increase the amount of re-radiated power from the eye and aid in identifying the glare source.

In one embodiment, it would be advantageous to use the windshield in place of a separate visor element and totally obviate the need for this device in the car. In place of an electric conductor pixelated matrix component, the sun visor, additional visor or window element may be constructed with a film or of a material having a property such that when an area thereon is excited by a radiation of a specific characteristic, the material reversibly changes its light transmissibility for the time of the irradiation. Reversibly photochromic materials are materials such as silverhalide crystals that change chemically when substantial amounts of ultraviolet light hit them and darken absorbing up to about 80% of the light. One or more scanning lasers with radiation that excites the material cover the critical viewing area. When aimed specifically at the location where the glare source rays intersect the screen, the screen at that point darkens absorbing them.

In another use besides glare stopping, the screen can be used for messaging such as in car diagnostic systems. Also, it can integrate as part of other screen projection systems and HUDs. It is necessary to add 3-D sensation to these systems to make the driver able to gauge distances. The glare system knowledge of the eye position is essential for many 3-D systems found in the art. Perlin, in U.S. Patent Application No. 20020015007 incorporated herein by reference, describes a display device which gives a true stereoscopic view of simulated objects, without artifacts such as 3-D glasses, to a single unencumbered observer, while allowing the observer to freely change position and head rotation. The apparatus comprises a display screen upon which stripes of the image appear in at least three distinct phases. A light blocking shutter is disposed in front of the display screen forming a stripe pattern which lets through only ⅓ of each stripe of the image on the display screen during each of the at least three distinct phases. An eye tracker identifies the locations of the observers' eyes and providing the location to the computer. All these elements already exist and can be used with the displays other safety and convenience devices intended for automobiles as will be explained below.

In another embodiment, in order to locate the eyes, the light coming naturally to the eye from the instrument panel is used. In another embodiment, where dials, normally indicated on the instrument panel, such as fuel and speed gauges are projected on the windshield, similar to a Heads-Up Display (HUD), the reflection of the projected images (which may have a special color and design specifically for this additional function) off the eye is used in its location. Light source and detector sets are positioned at typical eye fixation locations. These would include the instrument panel details, radio, rear view and side mirrors and the like. The system when detecting a saccade in a certain direction or just by loosing the gaze would fire the IR LEDs in an effort to acquire the new fixation.

In another embodiment to locate the eyes, especially when glasses are worn by the driver or for unusual eye shapes, multiple techniques and cameras may be used. Stronger pattern recognition techniques can be used with 1) two cameras that can locate via triangulation or 2) one camera using two irradiation sources placed apart at a known distance and analyzing the lengths of shadows. The distanced light sources, for example, one to the right and one to the left, may have different wavelengths and the light source strobed and the detector correlated with the timing, to eliminate other reflections to aid in the analysis. The light sources may be in the dashboard and shine up on the windshield or on the windshield could be one or more stickers that reflect the radiation. An invisible marker may be applied to the glasses so the camera has an easy way of recognizing them.

A holographic dot can be applied at the center of the glasses. The technique used to first locate the eyes may involve multiple flashes from various energy sources, emanating from different locations and may include the visible spectrum. This over any significant time would disturb the driver or expose him to undesirable radiation. Thus, once a "fix" has been obtained on the eyes, it is possible to use a less energetic technique as described earlier which relies on self radiated infrared or retro-reflection to continue to follow the eye until it is "lost" again say, by the driver turning his head.

In a similar method, once the eye location is known or the glare can be observed on the eye, the side and rearview mirrors may be made non-glaring. The mirrors are covered with a layer of material which can filter/block the light rays from headlights imaged by the eye. By first resolving on the eye, the source of the glare as by any of the previous techniques, and then, by having the distance between the mirror and the camera being a known value, the position on the mirror to be blocked is determined. Pixels on the overlay may be switched to a filtering or blocking mode or the mirror is an LCD mirror, that is there exists a mode in which the material is reflecting in a specular (angle of incidence equals angle of reflection) fashion and another mode in which it reflects light diffusely (irregularly in all directions). Thus, when reflected headlights of vehicles from behind disturb the driver, by knowing the location of the driver's eyes or by knowing which pixels, when darkened, lessen the glare as before in the oncoming headlight glare, the pixels at the location of the glaring headlights are turned to be diffuse reflecting or light absorbing.

In another embodiment, the source of the glare is not resolved from its reflection on the eye but rather the trial and error technique previously described is employed. Lines on the mirror/display are periodically darkened and the effect on the eye is recorded to determine the location of the pixels that are to be darkened. The blocking screen can also be placed on the inside of the driver's side window in the area where the mirror is viewed from when the window is closed.

In another embodiment, there is a determination of the eye location and another determination where the glaring rays are falling on the mirror from a camera or two cameras seeing the same view. In this case, the camera detector arrays can be analyzed to determine in space the location of the glare source. The distance between the camera and the mirror is known as well as the distance to the eyes and thus locating the pixels which will block the glare is readily possible.

For the purpose of obtaining eye fixation, that is, knowing what the driver is looking at, a radiation source and mirror visible to the camera, which may be a wide angle lens-camera, is placed at typical eye fixation locations such as the dashboard, radio dial or side view mirror. (The methodology for locating "red eye" when looking out of the windshield was described earlier.) When the eye is not looking ahead at the road, the controller will pick out "red eye" at a new location. Thus, it is possible to know where the driver is looking, and the controller will use this data concerning the driver's inattentiveness, to interact with other systems such as the pre-collision or sleepy driver warning system.

With the addition of the cameras and knowing the eye location and following the behavior of the driver, a larger number of other applications become possible. Breed in U.S. Pat. No. 6,324,453 enumerates a number applications based on passenger (and parts thereof) location alone. In this patent, other factors are included to increase the accuracy of the safety systems and such can be used herein as well.

In the system described herein and in FIG. 3, the camera (near UV, Visual and Infrared) is the main input device, for information within and without the vehicle, the computer does the analysis and the information is presented to the driver in its standard location and scaling. At the present, night vision using infrared cameras are available on cars. The scene from the camera is presented to the driver on the lower left side of the windshield in a less used area. A separate display area for night vision scene is not required in the invention. Instead, knowing the eye position and what is visible to the driver, i.e., the camera, (one camera with an addressable array consisting of detectors of selective wavelength sensitivity to differentiate between what the human eye can see and what only the camera can see, or having a switchable filter or using two separate but position correlated arrays) or cameras, differentiate(s) between the visible and infrared spectrums. The area where there is no contrast is an area devoid of visual information.

Thus, by knowing where the driver's eyes are relative to the windshield, it is possible to know what part of the windshield he is looking through to see the scene ahead. The computer plays off the visual camera versus the infrared camera to provide on the screen only that information not normally available through the visible spectrum. This view serves as an enhancement, not a replacement, to the normal visual information observed by the driver and keeps his eyes glued to the actual scene on the road ahead, rather than off to the side or to the dashboard.

With accurate knowledge as to the driver's gaze, the infrared camera view is presented superimposed, in the correct size and focus on the natural visual spectrum view. In addition as with Head Up Displays (HUD's) used in fighter aircraft, it will be possible to receive on demand (push button or voice recognition), or on a parameter basis—fuel below ¼ tank etc. or on a timed basis, speedometer, engine temperature and fuel tank information etc. on the screen. The image of the gauge will be positioned by the controlling computer in real time, on an area of the screen (as straight ahead as is possible) that does not contain at that moment vital information concerning the road ahead.

The windshield is normally clear but yet is reflecting. Normal glass reflects up to 4% from each surface in the visible spectrum, (even more in the infrared) and this reflection is used in the system. In another embodiment, it is possible to apply a dichroic reflection material, which may let most of the visible light pass through but is highly reflective to the specific wavelength of the projection device or one which phosphoresces or changes the wavelength of incident, violet or near UV or infrared, to reflected visible light.

Integrating the above system for day and night use to include: Glare Elimination from Mirrors as well as Oncoming Traffic, Enhanced Rear and Side Mirror Vision, Night Vision and Head Up Display of Speedometer, Gas Gauges etc., it is intended to provide a driver with an unobstructed view of all pertinent information in his or her personal surrounding on an as needed basis. The system works independently or with the present vision devices installed on today's cars for this purpose.

One part of the system is a clear display screen placed over the side and rearview mirrors. Besides eliminating glare as with the Anti Glare device, enhanced eye tracking information, which is capable of determining where the driver is looking (this can be accomplished as with using the "red eye" effect with emitters and detectors working off of mirrors, the windshield or a section of the windshield which is coated with a clear dichroic application which reflects a specific wavelength) will supply information to the controlling unit that the driver is trying to obtain information from the side or rear view mirror.

It is possible then to know which information is missing, such as cars in the "blind spot", or being blocked, for example, by a roof post or the back trunk, and fill in the information that is beyond the blockage, literally allowing the driver to see into blind spots and through the vehicle's body. For example, when a driver strains to position himself higher to see out of the rear view mirror, the controller is programmed to recognize the relocation of the eyes relative to the mirror and triggers the camera view to fill in the blanks. The driver will be seeing in the mirror the maximum view of all the essential information available, without distortion of the size or apparent distance.

The entire system is literally see-through and non-distracting and may be accomplished with the addition of two wide-angle cameras, a 360-degree view camera or a multiplicity of cameras mounted on the mirrors, within running lights, taillights and or headlights and/or specular reflecting surfaces mounted about the vehicle including the interior or exterior surfaces of the windows. For example the window exterior may reflect infrared radiation into an exterior mounted camera with a lens transparent to infrared thus giving the camera a view in both forward and rearward directions. The 360-degree view camera would have the additional benefit of simplifying communication between the camera and the controller.

Adding behavior, history and a library of traffic scenarios to the real time data input of driver actions, vehicle parameters, external environment and objects in the vehicle's vicinity, to computer analysis, will increase the system reliability, reduce false alarms and increase the driver's benefit from the system. Consumers will defer the use of safety devices being offered on cars if the number of false alarms is too great.

In practice, the system can operate as follows a driver indicates with a turn signal that a turn or lane change is possible. The controller or CPU 10 acquires data from camera 13 to asses if a vehicle is approaching on the left or the rear at such a rate that may indicate an attempt to pass on the left. The CPU 10 then determines if the driver has antecedently or immediately following the turn signal activation looked in the pertinent, side and rear view mirror. If he has looked in the side mirror, it is considered whether there is a vehicle lurking in the blind spot or approaching rapidly which would mean that perhaps he didn't see it. If so, the CPU 10 would indicate to the driver by a voice message, flash of a text warning on the windshield, sound an alarm etc. to warn of the suspected oversight. If the camera view indicates to the CPU 10 that the vehicle located along side is not visible to the driver looking in the side mirror, the CPU 10 replaces the view in the side mirror by activating the clear display screen overlay with a rearward camera view in which the vehicle is now visible. Alternately the mirror can be toggled by the CPU 10 between both views. Thus the driver is seeing the information in the standard view, placed where he is used to looking for it and there are no extra screens or alarms to distract him.

The system can be integrated with other vendors' safety systems. In one application to enhance a lane departure warning system such as AutoVue® from Iteris where they use a camera to track the lane markings (both solid and dashed) and continually feed the information directly into the unit's computer, which combines this data with the vehicle's speed. Using image recognition software and proprietary algorithms, the computer can predict when a vehicle begins to drift towards an unintended lane change. When this occurs, the unit automatically emits a distinctive rumble strip sound, alerting the driver to make a correction. As a further improvement of the present invention, the eye tracking technology and behavior analysis will know when this departure is unintended. That is, if driver has looked in a side mirror and there are no objects in view, then lane change is acceptable (even though he failed to use the turn indicator).

Scenario #1 before a lane change is ascertained and a vehicle is located in "blind spot": Driver looks in side mirror. The controller notes that object is in "blind spot and flashes wide angle camera view over mirror scene but need not sound an alarm.

Scenario #2 due to steering wheel position and lane following image processing (see lane departure warning above) or turning indicator activation it is known that the driver wants to or is inadvertently going change lanes and a vehicle is located in blind spot: Driver may also have looked in side mirror immediately preceding the lane deviation however did not see on coming vehicle in adjacent lane. Vehicle in "Blind Spot" warning is sounded and or an anti-collision system intervenes and the lane change is prevented.

As applied to an anticipatory crash warning system: the car is approaching another vehicle rapidly from the rear. The detector system with a view of objects within the vehicle's vicinity indicates rapid approach of an object in the vehicle's path. The controller needs to decide how early to sound an alarm or initiate automatic braking etc.

Scenario #1. The controller receives data that the driver has recently activated the turn signal and has looked in the side view mirror. The object being approached is moving slower the driver's vehicles in recent history. Controller waits longer before sounding the alarm because in most probability the driver intends to pass a slower moving object, which in this case is probably another vehicle.

Scenario #2. The controller receives data that the driver is now not looking through the windshield; rather he or she is looking down and to the right (probably busy tuning the radio). Controller will immediately sound the alarm and or begin braking because in most probability the driver has not seen the object.

Additional features and improvements to enhanced vision systems include:
1. Use mirrors and one camera to get to views for price of one camera. Use 360-degree camera either within and/or without the vehicle and computer rendering to undistort the picture. Use mirror in front of driver to specifically feed information to computer concerning the eyes or any other body parts. The camera thus can have a view of the driver's head or eyes from the side in addition to a front view which would aid in location. Use stickers, coatings or material treatment with very definite reflection patterns picked up by the camera placed about the vehicle which are easily identifiable by the controller for exact positioning correlation due to movement in the vehicle.
2. Use Quadrant Detector photo sensors instead of camera
3. Tracking the eye looking at a car diagram on instrument panel or windshield lets me know what devices the driver wants information on, in more detail and or larger size.
4. Camera at night can use retro-reflection off of enlarged pupil while during the day sufficient light enables pattern recognition and most often two methods may be used to corroborate eye location.
5. Cameras with view of outside positioned in head lights and rear taillights
6. In a night vision system used to enhance vision infrared radiation is used to irradiate the scene ahead and the reflected rays are captured in a camera sensitive to infrared. A separate source of infrared in addition to the headlights can be used. In another embodiment, the standard headlight is used. The high beam is operated at reduced voltage (A few DC volts below rated, this will not affect lifetime) so that it radiates mostly in the infrared, in conjunction with low beam. The aiming of the high beam is at higher angles and thus illuminates infrared rays a further distance for the night vision camera even when the car is in low beam.
7. Instead of LCD screen being on top of side mirror make twisted nematic "liquid crystal" or other type of "liquid crystal" material) of mirror like material i.e. high relative reflectivity and specular, and just leave black, unmirrored, the area from where the glare emanates to the drivers eye.
8. It is necessary when trying to locate the eye to ferret out reflections from the face parts such as ears. Camera on face can be sensitive to a very specific infrared wavelength. Some wavelengths of infrared radiation are absorbed within the eye differently than others and thus the retina returns less. Can also use hardly visible short wavelength violet (eye sensitivity to violet, is low) or non-visible, near ultra-violet as well on the face and camera can be selective to only these wavelengths with their telltale eye reflection characteristics. This way one camera is used with sequentially firing LEDs to obtain triangulated distance measurement. Alternately, a color camera essentially "knows" what colors it is seeing and can classify them. Thus a camera which differentially sees two distinct wavelengths of radiation fired simultaneous from different directions will see a shift in the position or shadow cast in one wavelength versus the other wavelength and thus the depth can be obtained more rapidly. Distance measurements by single Camera are based on change in image size with time or rapid auto-focusing techniques. However, two cameras are probably required due to the need for quick reactions in accident avoidance situations.

The Integrated Visual System consisting of from one to seven cameras; from one to three display screens and one or more projection systems for the windshield combined with head, eye locating & eye fixation tracking can carry out the following functions.
1. Stop glare from oncoming headlights. Darken Screen in line of sight of glare source.
2. Sleepy driver alert based on eye following behavior pattern established previously by driver. Algorithms based on eye blinking, object following by eyes, head position etc.
3. Extend range of drivers Night vision with image superimposed on scene. Analyze visual spectrum camera view. Area with no contrast is "dead". If infra-red camera sees objects contrasting with surround in vicinity of roadway, then project image of object such that it is in the same location on the scene, seen out of the windshield by the driver. Knowing eye location a virtual image projected of the scene will be able to compensate for parallax considerations.
4. Foggy vision: infrared cuts through fog. The near-infrared wavelength of light (830 nm) used in laser transmission occurs at one of these windows; therefore absorption is not generally a big concern in an infrared vision system. (However scattering of beam is still a problem.)
5. Head up display of pertinent instrument gages on "dead areas of windshield" as a virtual image focused out at "infinity to obviate the need of the driver to have to accommodate (focus in on) in order to read.
6. Stop glare from headlights emanating from interior rearview mirror by placing display screen over mirror and darkening pixels between eyes and reflected glare source.
7. Stop glare from headlights emanating from (exterior) side (rearview) mirror. By placing display screen over mirror and darkening pixels between eyes and reflected glare source.

8. Rear Parking Assist, utilizing rear camera, is initiated when drives shifts into reverse. By sensing the eye and head movements of the driver (e.g. the driver will edge up higher in the seat to see lower behind the trunk), the controller knows what image (even one through the trunk) to present on the normally clear) display overlaid on the rearview mirror and showing a distance readout from nearest object.
9. Anticipatory Crash Sensing by camera distance gauging system with eye tracking sensing position of driver and aiding in deployment of air bag.
10. Pre collision activation of air bag sensed by camera distance gauging system
11. Pre-collision activation of braking sensed by camera distance gauging system.
12. Occupant size determination for airbag activation both driver and passenger.
13. Camera of side mirror rear view. Car Blind spot
14. Eye tracking camera can automatically aim motorized mirrors or in another embodiment, vise versa the correct aiming of the rearview or side mirror is the initial calibration of the eye tracking system since at that time the driver is looking in the mirror, a good template is made of the eyes the distance in between them and the camera can always get a view of the eye. Subsequently, a computer-aided mirror-aiming regimen is entered into with manual feedback to the driver when all mirrors are correctly aimed or the process is motorized and automatic.
15. Motorized mirrors can be re-aimed to compensate for driver repositioning of driver to keep optimal alignment while driving.
16. Stored Template of driver's eye spacing can aid in driver's identification can also reset drivers pre-set seat settings.
17. Closing in at a dangerous rate alarm: Normally looking at the radio or other instrument settings is not the cause of an accident However, if in that instant when the driver is tuning his radio an object enters the vehicle's path an accident has a greater chance of occurring. The controller notes the accident-prone situation by the fact that the driver is not looking at the road ahead extra vigilance of the automatic warning system is in place and the "object up ahead" warning is activated or even braking.
18. The driver is looking in the mirror and something is blocking his view, then the mirror in addition to or in place of becomes a display screen and an enhanced camera view is substituted for the real view
19. Objects being approached or objects approaching from the front, side and rear. Determination of distance from and relative speed via reflected radiation and change on object size, two distanced corners and triangulation. Use of not naturally occurring wavelengths or timing and the use of subtracting the natural radiation level. That is an array's output is dumped and temporarily the irradiation is off. The received intensities are taken as background noise. Next the detectors are biased against this radiation level and the vehicles radiation source is flashed. The added radiation is now source specific and analyzed for location and speed.

All the above from gauging distance of threatening objects from with out, adding to night vision range, stopping glare, tailoring safety system device performance to the situation and occupants at hand can be accomplished with a single system based on cameras only vs. the prior art who uses multiple systems such as RADAR, ultrasonic, weight detectors etc.

Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention which is limited only by the following claims.

What is claimed is:

1. A system for imposing a filter between a vehicle driver's eyes and a source of light, comprising:
    at least one detector facing inward towards a position of the head of the vehicle driver and arranged to obtain images of elements associated with the eyes of the driver;
    processor means coupled to said at least one detector and arranged to determine the location of the drivers eyes based on analysis of the images obtained by said at least one detector and to obtain information about objects exterior of the vehicle providing sources of light from the images obtained by said at least one detector based only on reflections off of surfaces associated with the driver's eyes; and
    filter means coupled to said processor means for imposing a filter between the sources of light and the driver's eyes based on the location of the driver's eyes as determined by said processor means and the information about the exterior objects providing the sources of light obtained by said processor means.

2. The system of claim 1, wherein said filter means comprise a pixelated windshield.

3. The system of claim 1, wherein said filter means comprise a display screen.

4. The system of claim 1, further comprising a minor, said filter means comprising a pixelated film overlying said mirror to thereby filter glare from said mirror caused by the exterior objects providing the sources of light.

5. The system of claim 1, wherein said filter means comprise a LCD screen integrated into a mirror and capable of providing selective reflecting portions and non-reflecting portions, said processor means being arranged to control the reflectivity of the portions of said LCD screen such that said LCD screen is provided with non-reflecting portions at the site of glare caused by the exterior objects providing the sources of light.

6. The system of claim 5, further comprising an image sensor coupled to said processor means for obtaining images of the enviromnent exterior of the vehicle, said processor means being arranged to correlate the images obtained by said image sensor to images being displayed on said LCD screen to enable display of the images obtained by said image sensor when the driver's view is blocked.

7. The system of claim 1, wherein said processor means comprise pattern recognition means for applying pattern recognition techniques to obtain information about the exterior objects providing sources of light from the images obtained by said at least one detector based on reflections off of the driver's eyes.

8. The system of claim 1, wherein the information about the exterior objects providing sources of light includes the position of the objects.

9. The system of claim 1, wherein said processor means are arranged to determine a ray between the driver's eyes and the sources of light and determine the location of an intercept point at which said filter means will impose the filter.

10. The system of claim 1, wherein said filter means are arranged to impose a filter capable of reflecting or absorbing the light from the source of light.

11. The system of claim 1, wherein said filter means comprise a displaceable display screen movable between a first position between the driver and the windshield of the vehicle and a second position not interposed between the driver and the windshield whereby said display screen is selectively movable by the driver to the first position only when glare is present.

12. The system of claim 1, wherein said filter means comprise a display screen, said at least one detector being arranged on said screen.

13. The system of claim 1, wherein said filter means comprise a pixelated screen, said processor means being arranged to determine a ray between the driver's eyes and the sources of light and determine which pixels of said pixelated screen are situated at an intercept point and then activate those pixels to reflect or absorb light.

14. The system of claim 1, wherein said filter means comprise a glare screen and said at least one detector is arranged at a fixed location relative to said filter means such that said processor means generate a vector indicative of an angle to the source of light.

15. The system of claim 1, further comprising at least one radiation emitting element with known location and light characteristics capable of having said radiation reflected from surfaces proximate to, and including, the driver's eyes, said processor means being arranged to consider the properties of the reflected radiation to facilitate the location of exterior light source objects and/or to facilitate location of the driver's eyes.

16. A method for imposing a filter between a vehicle driver's eyes and a source of light, comprising the steps of:
arranging at least one detector to face inward towards a position of the head of the vehicle driver;
obtaining images of surfaces proximate to, and including, the eyes of the driver from the at least one detector;
determining the location of the driver's eyes based on analysis of the images obtained by the at least one detector;
obtaining information about objects exterior of the vehicle providing sources of light from the images obtained by the at least one detector based only on reflections off of surfaces proximate to, and including, the driver's eyes; and
imposing a filter between the sources of light and the driver's eyes based on the determined location of the driver's eyes and the obtained information about the exterior objects providing the sources of lights.

17. The method of claim 16, further comprising the steps of:
determining a ray between the driver's eyes and the sources of light; and
determining the location of an intercept point at which the filter will be impose the filter.

18. The method of claim 16, further comprising the steps of:
providing a display screen as the filter; and
arranging the at least one detector being arranged on the screen.

19. The method of claim 16, wherein the filter is a pixilated screen, further comprising the steps of:
determining a ray between the driver's eyes and the sources of light;
determining which pixels of the pixilated screen are situated at an intercept point; and
then activating those pixels to reflect or absorb light.

20. The method of claim 16, further comprising the steps of:
mounting at least one radiation emitting element with known location and light characteristics capable of having said radiation reflected from surfaces proximate to and including the driver's eyes; and
factoring the properties of the reflected radiation to facilitate the location of exterior light source objects and/or to locate the driver's eyes.

* * * * *